(12) United States Patent
Hatakeda et al.

(10) Patent No.: US 9,466,065 B2
(45) Date of Patent: Oct. 11, 2016

(54) INTEGRATING USAGE INFORMATION WITH OPERATION OF A SYSTEM

(75) Inventors: Darrin Hatakeda, Redmond, WA (US); Gunnar Ljosdahl Rasmussen, Tromso (NO); Krister Mikalsen, Tromso (NO); Dag Steinnes Eidesen, Tromso (NO); John D. Fan, Redmond, WA (US); Adrian Fanaru, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 115 days.

(21) Appl. No.: 13/287,780

(22) Filed: Nov. 2, 2011

(65) Prior Publication Data

US 2013/0110868 A1    May 2, 2013

(51) Int. Cl.
| | | |
|---|---|---|
| *G06F 7/00* | (2006.01) | |
| *G06F 17/30* | (2006.01) | |
| *G06Q 30/02* | (2012.01) | |

(52) U.S. Cl.
CPC ......... *G06Q 30/02* (2013.01); *G06F 17/30867* (2013.01)

(58) Field of Classification Search
CPC .............. G06F 17/30867; G06F 17/3089; G06F 17/30864; G06F 17/30; G06F 17/30274; G06F 17/30861; G06F 17/30887; G06F 17/30893; G06F 15/173; G06F 17/30554; G06F 17/30038; G06F 17/30312
See application file for complete search history.

(56) References Cited

U.S. PATENT DOCUMENTS

| | | | |
|---|---|---|---|
| 6,513,052 B1 | 1/2003 | Binder | |
| 7,092,936 B1 | 8/2006 | Alonso et al. | |
| 7,130,810 B2 | 10/2006 | Foster | |
| 7,546,295 B2 | 6/2009 | Brave et al. | |
| 7,844,590 B1 | 11/2010 | Zwicky et al. | |
| 7,941,394 B2 | 5/2011 | Error | |
| 8,140,553 B2 | 3/2012 | Futatsugi | |
| 8,244,745 B2 | 8/2012 | Lim | |
| 8,543,907 B1* | 9/2013 | Roskind ........................ 715/234 |
| 2002/0062323 A1* | 5/2002 | Takatori ............ G06F 17/30864 715/206 |

(Continued)

FOREIGN PATENT DOCUMENTS

| | | |
|---|---|---|
| CN | 101706813 A | 5/2010 |
| CN | 101833570 A | 9/2010 |

(Continued)

OTHER PUBLICATIONS

Office Action mailed Aug. 1, 2013, in U.S. Appl. No. 13/287,863.

(Continued)

*Primary Examiner* — Azam Cheema
(74) *Attorney, Agent, or Firm* — Julie F. Akhter; Tom Wong; Micky Minhas

(57) ABSTRACT

Usage information relating to interaction with content is integrated with operation of a system, such as a content management system. The usage information is collected, stored and provided to the system. The usage information may be integrated with the operation of the system in many different ways (e.g. recommendations for other content, most viewed content, most "liked" content, content viewed by a type of user, and the like). The usage information may also be used to adjust different operations of the service. For example, the usage information may be used to adjust: a retention time of content (e.g. don't delete a recently viewed document), a crawl policy of content; a backup policy of content; restore schedules; identification of storage tier levels; and the like.

23 Claims, 5 Drawing Sheets

(56) References Cited

U.S. PATENT DOCUMENTS

| | | | |
|---|---|---|---|
| 2006/0059042 A1* | 3/2006 | Zohar | G06Q 30/02 705/14.46 |
| 2006/0277585 A1 | 12/2006 | Error | |
| 2007/0028261 A1* | 2/2007 | Bouilloux-Lafont | G06Q 30/02 725/32 |
| 2007/0244748 A1* | 10/2007 | Smith | G06Q 30/02 705/14.46 |
| 2008/0120407 A1* | 5/2008 | Chen et al. | 709/224 |
| 2008/0183664 A1 | 7/2008 | Cancel et al. | |
| 2008/0183745 A1 | 7/2008 | Cancel et al. | |
| 2009/0019033 A1 | 1/2009 | Lee | |
| 2009/0133059 A1* | 5/2009 | Gibbs | G06F 17/30038 725/34 |
| 2009/0138592 A1 | 5/2009 | Overcash | |
| 2009/0292677 A1 | 11/2009 | Kim | |
| 2010/0095215 A1 | 4/2010 | Elven | |
| 2010/0121777 A1 | 5/2010 | McGonigal | |
| 2010/0121850 A1 | 5/2010 | Moitra | |
| 2010/0211886 A1 | 8/2010 | Forstall | |
| 2010/0251128 A1 | 9/2010 | Cordasco | |
| 2011/0161164 A1 | 6/2011 | Anderson | |
| 2012/0041862 A1 | 2/2012 | Bul et al. | |
| 2012/0179646 A1* | 7/2012 | Hinton et al. | 707/607 |
| 2012/0215684 A1 | 8/2012 | Kidron | |
| 2012/0284114 A1 | 11/2012 | Huang | |
| 2013/0028573 A1* | 1/2013 | Hoofien et al. | 386/248 |
| 2013/0030908 A1* | 1/2013 | Gessner | G06Q 30/0277 705/14.45 |
| 2016/0103832 A1 | 4/2016 | Eidesen et al. | |

FOREIGN PATENT DOCUMENTS

| | | |
|---|---|---|
| JP | 2001-312511 | 11/2001 |
| JP | 2006-505161 | 2/2006 |
| JP | 2007-172091 | 7/2007 |
| TW | 201025069 A | 7/2010 |

OTHER PUBLICATIONS

Office Action mailed Sep. 6, 2013, in U.S. Appl. No. 13/287,831.

Atterer, R., et al.; "Knowing the User's Every Move—User Activity Tracking for Website Usability Evaluation and Implicit Interaction"; WWW 2006, May 23-26, 2006, Scotland; 10 pgs.

Bayir, M., et al.; "Smart Miner: A New Framework for Mining Large Scale Web Usage Data"; International World Wide Web Conference Committee (IW3C2); WWW 2009; Apr. 20-24, 2009, Spain; 10 pgs.

Chi, E.; "Improving Web Usability Through Visuzalization"; IEEE Internet Computing; Mar./Apr. 2002; http://computer.org/internet/; 8 pgs.

Dou, W., et al.; "Brand Positioning Strategy Using Search Engine Marketing"; MIS Quarterly vol. 34, No. 2, pp. 261-279; Jun. 2010; 24 pgs.

Eirinaki, M., et al.; "Web Mining for Web Personalization"; ACM Transactions on Internet Technology, vol. 3, No. 1, Feb. 2003; 27 pgs.

Fraternali, et al., "Model-Driven Web Usage Analysis for the Evaluation of Web Application Quality", In Journal of Web Engineering, 2003, 29 pages.

Ganapathi, A., et al.; "Web Analytics and the Art of Data Summarization"; SLAML 2011; Oct. 23, 2011; Portugal; 9 pgs.

Ochoa, X., et al.; "Use of Contextualized Attention Metadata for Ranking and Recommending Learning Objects"; CAMA '06, Nov. 11, 2006; Virginia, USA; 7 pgs.

Page, L.; "The PageRank Citation Ranking: Bringing Order to the Web"; Jan. 29, 1998; 18 pgs.

Sen, A., et al.; "Current Trends in Web Data Analysis"; Communications of the ACM; Nov. 2006, vol. 49, No. 11; 7 pgs.

Souer, J., et al.; "Engineering a Design Method for Web Content Management Implementations"; iiWAS2008; Nov. 24-26, 2008; Austria; 8 pgs.

Srivastava, et al., "Web Usage Mining: Discovery and Applications of Usage Patterns from Web Data", In Proceedings of ACM SIGKDD Explorations, vol. 1, Issue 2, Jan. 2000, pp. 12-23.

Vallet, D., et al.; "Effects of Usage-Based Feedback on Video Retrieval: A Simulation-Based Study"; ACM Transactions on Information Systems, vol. 29, No. 2, Article 11; Apr. 2011; 32 pgs.

Wang, Q., et al.; "Characterizing Customer Groups for an E-commerce Website"; EC '04, May 17-20, 2004; New York, USA; 10 pgs.

Xiao, B., et al.; "E-Commerce Product Recommendation Agents: Use, Characteristics, and Impact"; MIS Quarterly vol. 31, No. 1, pp. 137-209/Mar. 2007.

Zagorodnov, D., et al.; "WAIFR: Web-Browsing Attention Recorder Based on a State-Transition Model"; CAMA '06 Nov. 11, 2006; Virginia, USA; 6 pgs.

U.S. Appl. No. 13/287,831, entitled "Extensibility model for usage analytics used with a system"; filed Nov. 2, 2011; Fanaru, et al.

U.S. Appl. No. 13/287,863, entitled "Ad-hoc queries integrating usage analytics with search results"; filed Nov. 2, 2011; Eidesen, et al.

U.S. Appl. No. 13/287,891, entitled "Search driven user interface for navigating content and usage analytics"; filed Nov. 2, 2011; Mikalsen, et al.

International Search Report mailed Feb. 28, 2013, in PCT/US2012/063079.

Office Action mailed Feb. 19, 2013, in U.S. Appl. No. 13/287,831.

Office Action mailed Dec. 4, 2013, in U.S. Appl. No. 13/287,891.

International Search Report mailed May 22, 2015, in PCT/US2012/063079, 5 pgs.

Office Action mailed Mar. 26, 2015, in U.S. Appl. No. 13/287,863, 20 pgs.

Office Action mailed Apr. 8, 2015, in U.S. Appl. No. 13/287,831, 6 pgs.

Office Action mailed May 2, 2014, in U.S. Appl. No. 13/287,863.

Office Action mailed Jul. 29, 2014, in U.S. Appl. No. 13/287,891, 14 pgs.

Office Action mailed Jul. 30, 2014, in U.S. Appl. No. 13/287,831, 11 pgs.

Office Action mailed Jan. 8, 2015, in U.S. Appl. No. 13/287,891, 19 pgs.

Chinese Office Action Issued in Patent Application No. 201210434823.6, Mailed Date: Oct. 19, 2015, 13 Pages.

Notice of Allowance mailed Aug. 14, 2015, in U.S. Appl. No. 13/287,863, 12 pgs.

Office Action mailed Sep. 10, 2015, in U.S. Appl. No. 13/287,831, 8 pgs.

European Official Communication in Application 12846593.7, mailed Jun. 10, 2015, 1 pg.

Office Action mailed Feb. 29, 2016, in U.S. Appl. No. 13/287,831, 18 pgs.

Chinese 2nd Office Action in Application 201210434823.6, mailed Jun. 15, 2016, 14 pgs.

U.S. Appl. No. 13/287,831, Appeal Brief filed Jul. 18, 2016, 30 pages.

* cited by examiner

INTEGRATING USAGE INFORMATION WITH OPERATION OF A SYSTEM

BACKGROUND

Different analytics data systems analyze data and produce reports for a user to view. The data analyzed is data that has previously been generated and stored. For example, an analytics data system may be configured to analyze business data, web traffic data, sales data, and the like. The reports may be used for a variety of different purposes by the customer of the analytics data systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Usage information relating to interaction with content is integrated with operation of a system, such as a content management system. The usage information is collected, stored and provided to the system. The usage information may be integrated with the operation of the system in many different ways. For example, the usage information may be associated with a search service of the system such that the results provided by the search service are filtered based on the collected usage information (e.g. recommendations for other content, most viewed content, most "liked" content, content viewed by a type of user, and the like). The usage information may also be used to adjust different operations of the service. For example, the usage information may be used to adjust: a retention time of content (e.g. don't delete a recently viewed document), a crawl policy of content; a backup policy of content; restore schedules; identification of storage tier levels; and the like. The usage information may be analyzed and aggregated at different levels (e.g. site, tenant, system) that may be used to filter results that are provided to a user.

DETAILED DESCRIPTION

Figure 1:
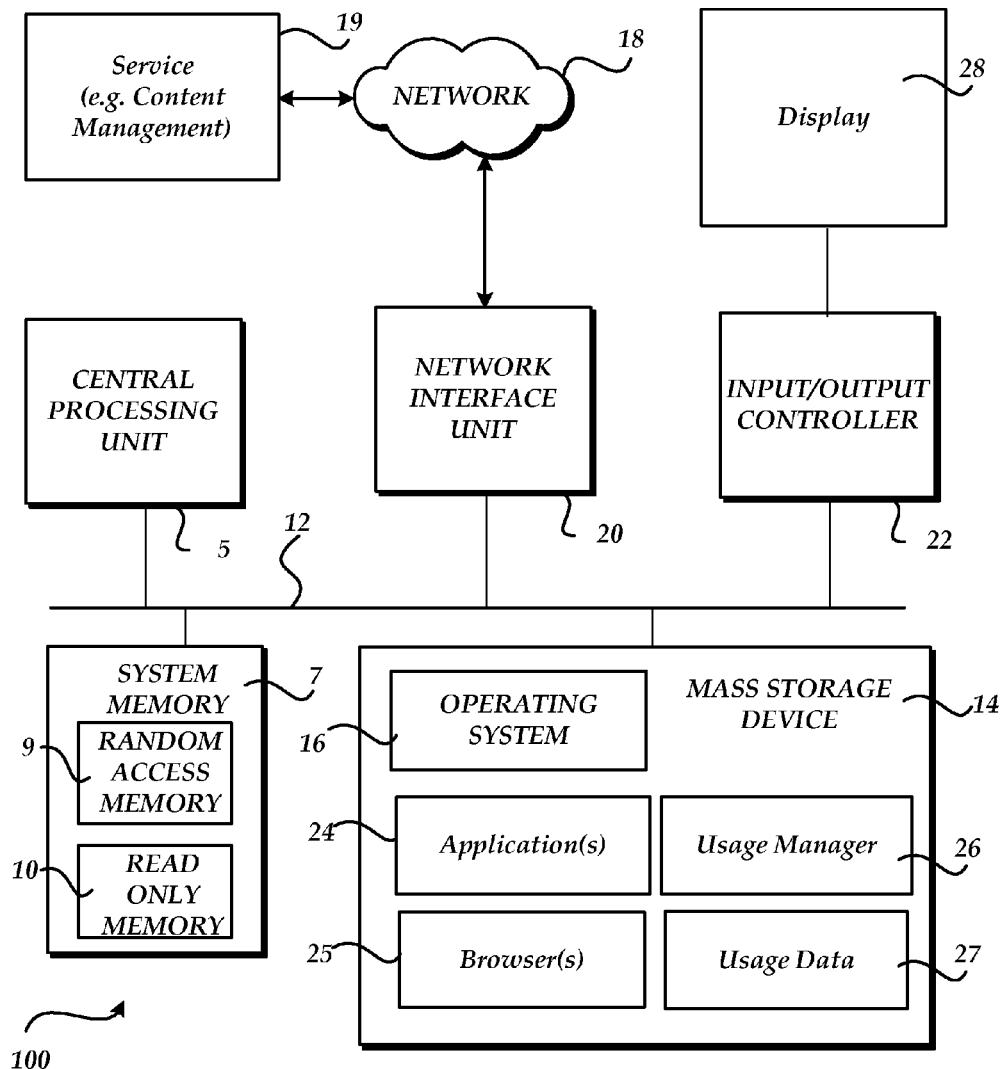
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, collected usage data 27, and other program modules, such as Web browser 25, and usage manager 26, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as a usage manager 26, productivity applications (e.g. a content management application such MICROSOFT SHAREPOINT), and may store one or more Web browsers 25. The Web browser 25 is operative to request, receive, render, and provide interactivity with electronic content, such as Web pages, videos, documents, and the like. According to an embodiment, the Web browser comprises the INTERNET EXPLORER Web browser application program from MICROSOFT CORPORATION.

Usage manager 26 is configured to integrate collected usage information relating to interaction (e.g. user interaction and system event interaction) with content for a system, such as a content management system. Usage manager 26 may be configured as an application/process and/or as part of a cloud based multi-tenant service that provides resources (e.g. services, data . . . ) to different tenants (e.g. MICROSOFT OFFICE 365, MICROSOFT SHAREPOINT ONLINE). Generally, usage manager 26 is configured to collect usage information relating to interaction with content and to integrate the content to affect an operation of a system, such as service 19. The usage information may relate to different types of interaction with content (e.g. viewed, selected, purchased, recommended, downloaded, and the like) as well as system interactions. The usage information of content is collected, stored and provided to the system.

The usage information may be integrated with the operation of the system in many different ways. For example, the usage information may be associated with a search service of the system such that the results provided by the search service are filtered based on the collected usage information (e.g. recommendations for other content, popular content, most "liked" content, content viewed by a type of user, and the like). The usage information may also be used to adjust different operations of the service. For example, the usage information may be used to adjust: a retention time of content (e.g. don't delete a recently viewed document), a crawl policy of content; a backup policy of content; restore schedules; identification of storage tier levels for content; and the like. The usage information may be analyzed and aggregated at different levels (e.g. site, tenant, system) that may be used to filter results that are provided to a user. Additional details regarding the operation of usage manager 26 and integration of collected usage information will be provided below.

Figure 2:
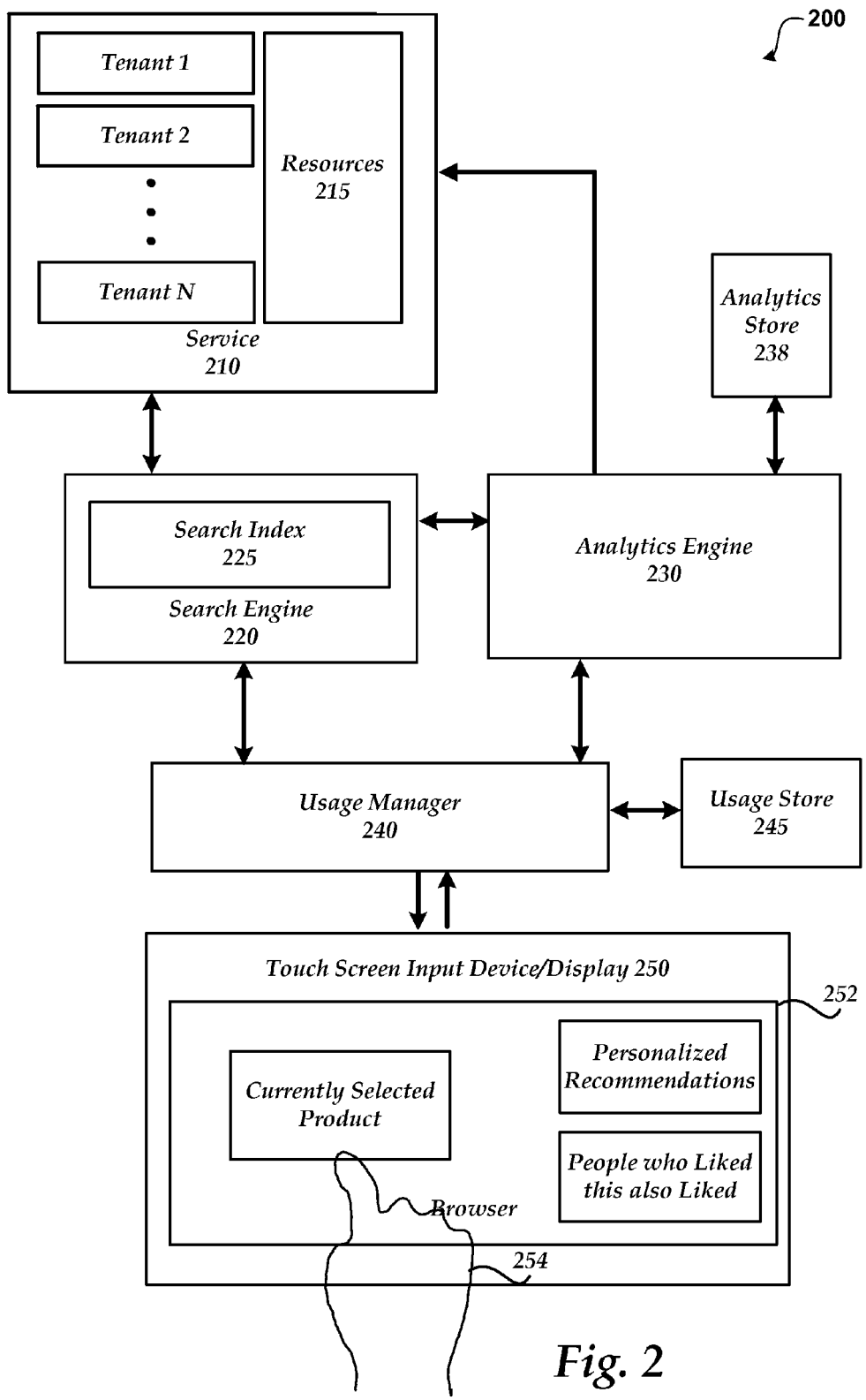
FIG. 2 illustrates an exemplary system for integrating usage information with operation of a service.

FIG. 2 illustrates an exemplary system for integrating usage information with operation of a service. As illustrated, system 200 includes service application 210, search engine 220, analytics engine 230, analytics store 238, usage manager 240, usage store 245 and touch screen input device/display 250. As illustrated, service 210 is a cloud based and/or enterprise based service that is configured to provide content management services (e.g. MICROSOFT SHAREPOINT). Service 210 may also be configured as a client based application. Although system 200 shows a content management service, other services/applications may be configured to integrate collected usage information that is used to adjust the application/service's operation.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data. For example, service 210 may be configured to provide services corresponding to productivity applications (e.g. content management, word processing, spreadsheet, presentation, messaging . . . ), and the like.

System 200 as illustrated comprises a touch screen input device/display 250 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 250 shows an exemplary UI display 252 for receiving usage information (e.g. selection of content) and displaying information to a user. Usage manager 240 is configured to receive input from a user (e.g. using touch-sensitive input device 250 and/or keyboard input (e.g. a physical keyboard and/or SIP)). For example, usage manager 240 may receive touch input 254 that is associated with a UI 252 for integrating usage information with operation of a service.

The usage manager 240 may be stored at one or more locations and may be accessed from one or more different locations. For example, a user may access a cloud-based usage manager using a web browser, using a locally installed usage manager that is configured to communicate with the search service application, and/or a combination of a cloud based service and an installed usage manager. According to an embodiment, usage manager 240 operates on each server computing device that receives user interaction with content/resources of service 210.

Usage manager 26 is configured to collect usage information from users of a service (e.g. service 210) and from system eventsUsage information may be obtained from more than one service. For example, usage information may be obtained from one or more other services that is integrated with the operation of service 210. The usage information may contain a variety of different information. For example, the usage information may relate to a user action, such as a view of content, a download of content, preview of content, a user rating of content, a purchase of content, a recommendation of content, and the like. The collected usage information is stored within usage store 245.

Usage manager 240 provides the collected usage information to analytics engine 230 and/or search engine 220. The usage information may be provided at predetermined times and/or upon being received. For example, the usage information may be provided to analytics engine 230 each day, each hour, every 15 minutes and the like.

Analytics engine 230 may be configured to perform different types of analysis using the collected usage information. For example, analytics engine 230 may be configured to determine the most popular content, related content, personalized content, new content, recommendations based on social network(s), most profitable items, most recommended items, and the like. Analytics engine 230 may also aggregate data at different levels. For example, for a content management service 210 including tenants and sites, analytics engine 230 may aggregate data at a site level, a tenant level and at the service level. Analytics engine 230 may also aggregate usage information for a specified period of time (e.g. last hour, day, week, month, quarter, year, and the like).

The analytics engine 230 may be configured differently based on the system/service to which the usage information applies. For example, for an online store, the analytics engine 230 may be configured as a recommendation system and a sales system (e.g. item recommendations, related item content, recommendations, . . . ). For a service that provides content (e.g. video, music, new stories, document . . . ), analytics engine 230 may be configured to provide related content to view, recommended content to view, most recently accessed content, most popular items, and the like.

Search engine 220 is configured to receive collected usage information and store the usage information within a search index (e.g. search index 225). The usage information may be raw usage information received directly from usage manager 240 and/or usage information that has already been analyzed. When a user performs a query and/or identifies content/item, the search engine 220 returns results based on the identification of content and any related content identified using the collected usage information related to the identification of the content. For example, the search results may include the most popular results as determined by users (e.g. views, recommendations, ratings . . . ), new content that has recently been added, recommended items as determined by analytics engine 230, items your friends have recently viewed/recommended (e.g. through a social network), and the like.

The recommendations may include a variety of recommendations, such as related items, personalized recommendations, social recommendations and the like. The search results may be filtered based on a variety of different data (e.g. cost of item, popularity of item, margin of item, and the like). Some example searches may include searches such as: How many documents were tagged with "KCI" in the last week/month? How many documents were tagged by John Doe with "KCI" in the last week/month? What are the documents that were not used in the last 6 months? What are the most popular documents (number of views)? What were the most popular documents last week/last month/two, three weeks ago? What were the most popular authors? What are the most popular tags? What were the most popular tags in the last week? What tags/metadata are trending up/down in absolute/percentage values? What is the intersection between most popular documents and most popular tags? For example, there are a lots of new documents tagged with "BLABLA" but there have been very few views of these new documents. Are the documents miss-categorized or just not interesting to anyone?

Service 210 may integrate the usage information with its operation. Service 210 may utilize the usage information to alter: a retention time of content, a crawl policy of content; a backup policy of content; restore schedules; storage tier levels; and the like. For example, service 210 may automatically alter its retention policy to save content for a period of time longer/shorter for content based on when content is accessed, how many times content has been viewed within a time period, and the like (e.g. content is maintained a week longer if accessed within a week before scheduled deletion date). A crawl schedule may be updated based on usage information (e.g. popular content is crawled more often). A storage tier level (e.g. content to store online, content to be backed up, content to be stored off-line, . . . ) may be identified based on the collected usage information (e.g. popular content is stored online and unpopular content is stored in offline storage). Computing resources for a tenant/site/collection may also be adjusted based on the collected usage information (e.g. more resources provided to heavily viewed content, a large number of downloads, and the like). Service 210 may also use the analytics engine 230 to track document lifecycle events, trends, social data, and the like.

Figure 3:
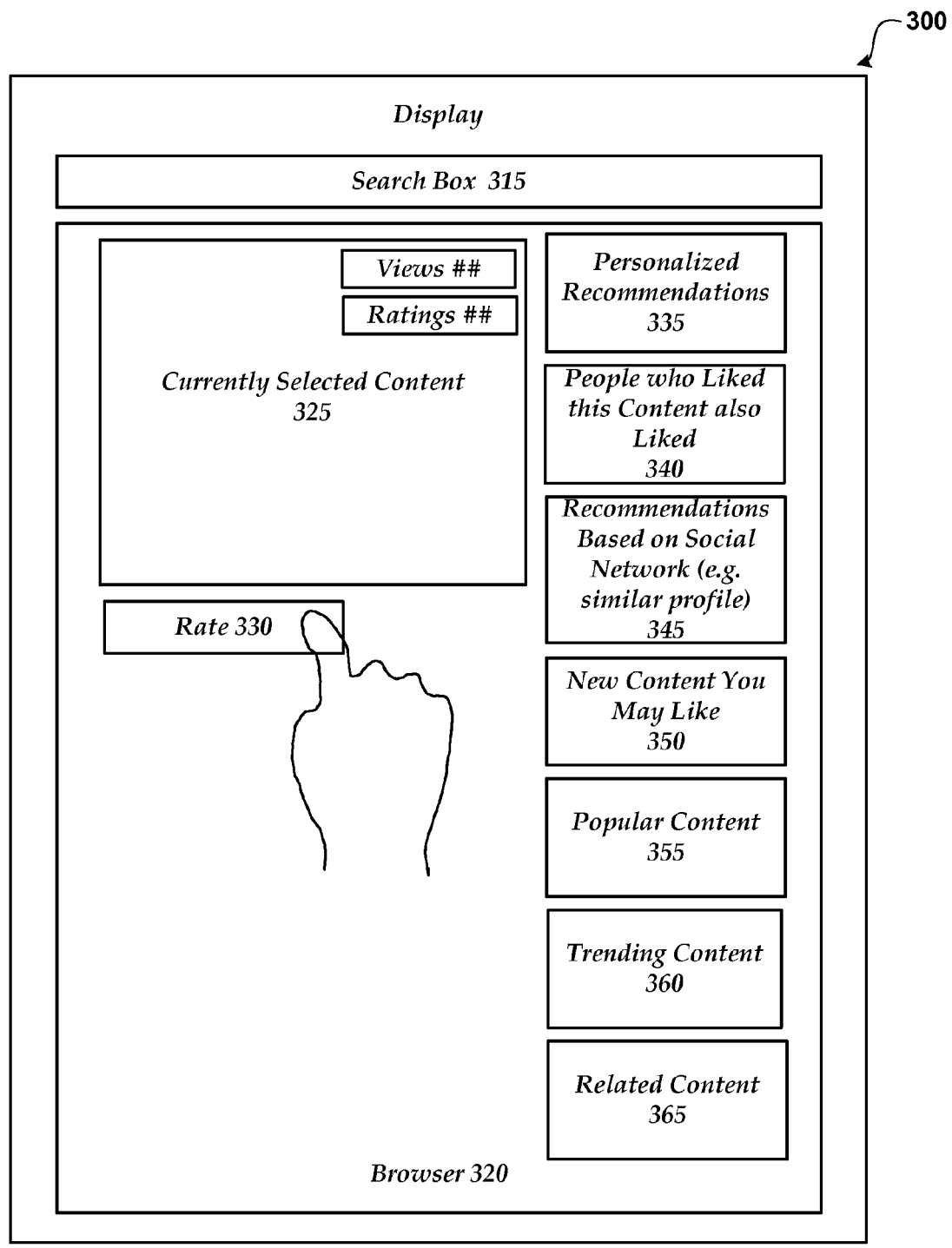
FIG. 3 shows an exemplary display that integrates usage information with results returned in a search.

FIG. 3 shows an exemplary display that integrates usage information with results returned in a search.

As illustrated, display 300 includes search box 315, browser 320 including a display of currently selected content 325, rate option 330, personalized recommendations 335, people who like this content also liked 340, social network recommendations 345, new content you may like 350, popular content 355, trending content 360 and related content 365. More or less information may be displayed. The different information displayed in display 300 is for purposes of explanation and is not intended to be limiting.

Content may be identified by a search engine of a service in response to a variety of different actions. For example, a user may enter a query in search box 315 to obtain search results. A user may also navigate to the currently selected content (e.g. select content (product, content)) that the user is interested in viewing. The search results returned to the user may be filtered based on the collected usage information.

In the current example, the user personalized recommendations 335, people who like this content also liked 340, social network recommendations 345, new content you may like 350, popular content 355, trending content 360 and related content 365 are determined in part on the collected usage information and the identification of the content through entry of a search query or navigation to the content. The displayed content may include a display of usage information that relates to the content. For example, currently selected content 325 shows a number of views for the content and a number of ratings for the content.

Personalized recommendations 335 are recommendations of content that are based on a user's past actions (e.g. views, ratings, recommendations). The recommendations may also be based on related items to the currently selected content. For example, if a user is viewing a shirt, they may have also viewed pants, shoes and belts.

People who liked this content also liked 340 is based on other users who have viewed the currently selected content 325 and other items that they also viewed. For example, other users who liked the currently selected content 325 also liked this other content.

Recommendations based on Social Networks 345 are items that are recommended by a user's profile and/or people within the user's social network(s).

New content you may like 350 is content that has been recently added. For example, the new content may be content that has been added in the last week, month, and the like.

Popular content 355 shows the user content that is popular for the current search. The content that is popular for the current search may include content determined from one or more searches related to the current search. For example, when the search relates to item X, the popular content may include content related to most viewed items in a category relating to item X. Trending content 360 is content that is on its way up in popularity (e.g. recently popular and becoming more popular).

Related content 365 is content that is related to the currently selected content but is content that is not typically returned in response to a search for the currently selected content.

Rating button 330 may be selected for a user to rate content. For example, a user may rate the content on a scale (e.g. 1-10, like, dislike). The rating information is provided to the service and included within a search index.

Figure 4:
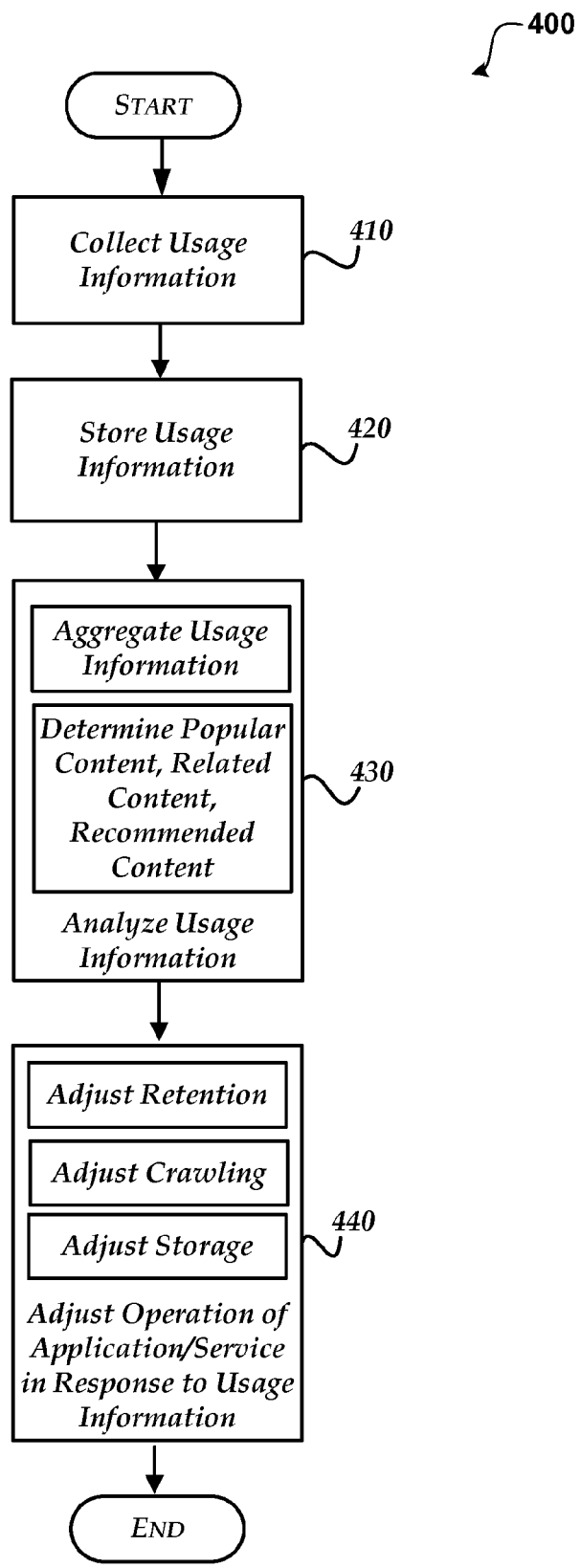
FIG. 4 shows a process for collecting usage information and integrating the usage information with operation of a system.
Figure 5:
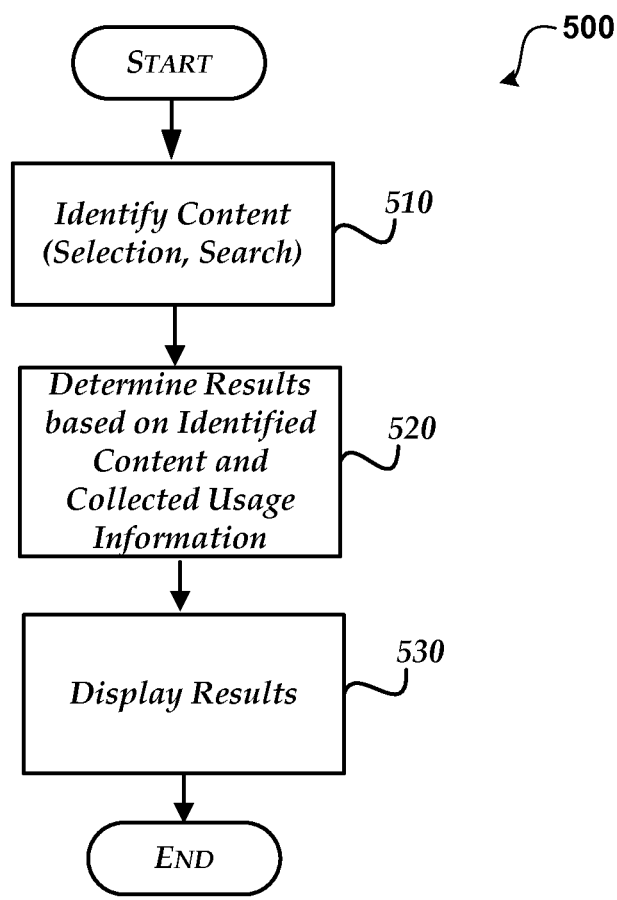
FIG. 5 illustrates a process for displaying search results that use collected usage information.

FIGS. 4-5 show an illustrative process for integrating usage information with real-time presentation of content for a system. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are illustrated in an order, the ordering of the operations may change depending on the configuration.

FIG. 4 shows a process for collecting usage information and integrating the usage information with operation of a system.

After a start operation, the process flows to operation 410 where usage information is collected. The usage information may relate to different types of user interaction with content (e.g. viewed, selected, purchased, recommended, downloaded, and the like) as well as system interaction with the content (e.g. automated system events). Generally, any usage information that interacts with content that can be collected.

Moving to operation 420, the collected usage information is stored. The collected usage information may be stored in a data store and/or within a search index that is used by the service. The collected usage information may be stored before and/or after the usage information is analyzed (see operation 430). The stored usage information may be raw usage information collected and/or usage information that has already been analyzed. When a user performs a query and/or selects content, the search engine may be configured to return results based on the query/selection and any related usage information related to the search query.

Flowing to operation 430, the collected usage information is analyzed. Different types of analysis may be performed using the collected usage information. For example, usage information may be used to determine: popular content, related content, personalized content, newly added content, recommendations based on social network(s), most profitable items, most recommended items, and the like. Usage information may also be aggregated at different levels. For example, usage information may be aggregated at a site level, a tenant level and at the service level. Usage information may also be aggregated for a specified period of time (e.g. last hour, day, week, month, quarter, year, and the like).

Transitioning to operation 440, operation of the application/service is automatically adjusted in response to the integration of the collected usage information. For example, the collected usage information may be used to affect: a retention time of content, a crawl policy of content; a backup policy of content; restore schedules; storage tier levels; and the like.

The process then moves to an end operation and returns to processing other actions.

FIG. 5 illustrates a process for displaying search results that use collected usage information.

After a start operation, the process 500 flows to operation 510, where content is identified. Content may be identified using different methods. For example, a user may enter a search query and/or navigate to content.

Moving to operation 520, results to display that use the collected usage information are determined. For example, the results may include content identified to be: user personalized recommendations, people who like this content also liked this presented content, social network recommendations, new content a user may like, popular content, trending content and related content, and the like.

Flowing to operation 530, the results are displayed. The displayed results may also include a display of usage information that relates to the content. For example, the results displayed may show a number of views for the content and a number of ratings for the content.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
    collecting, at a server of a service, usage information that relates to content of the service, wherein the content is provided by a plurality of websites and accessed by one or more client devices;
    aggregating the collected usage information at a site-level of a website, wherein the website is one of the plurality of websites;
    analyzing the aggregated usage information; and
    adjusting the service, wherein the adjusting further comprises: modifying an allocation of content assigned to one or more storage tier levels corresponding with the website based on an analysis of the aggregated usage information, wherein the modifying comprises moving the content between a storage resource of a first storage tier and a storage resource of the second storage tier, wherein the first storage tier corresponds to content that is stored online and the second storage tier corresponds to content that is stored offline.

2. The method of claim 1, wherein the service is a content management service that comprises tenants and websites.

3. The method of claim 1, further comprising providing the aggregated usage information to the service and storing the aggregated usage information within a search index.

4. The method of claim 1, wherein analyzing the aggregating further comprises aggregating the collected usage information to a level of a tenant that accesses the content using the one or more client devices.

5. The method of claim 4, wherein the adjusting further comprises determining content recommendations for the tenant based on analysis of the aggregated usage information, and transmitting the content recommendations to a client device associated with the tenant.

6. The method of claim 1, further comprising providing the analysis of the aggregated usage information to a search engine service.

7. The method of claim 1, wherein the adjusting further comprises modifying a number of storage devices associated with the website.

8. The method of claim 7, wherein the modifying of the number of storage devices further comprises changing an allocation of the storage devices for one or more of the first storage tier and the second storage tier.

9. The method of claim 1, wherein the modifying of the allocation of content assigned to the one or more storage tier levels further comprises moving the content from the storage resource of the first storage tier to the storage resource of the second storage tier.

10. The method of claim 1, wherein the modifying of the allocation of content assigned to the one or more storage tier levels further comprises moving the content from a storage resource of the second storage tier to a storage resource of the first storage tier.

11. A computer-readable storage device having computer-executable instructions for integrating usage information with a service, wherein the computer-executable instructions, when executed by a computing device, causing the computing device to execute a method comprising:
    collecting, at a server of the service, usage information that relates to content of the service that is provided by a plurality of websites;
    aggregating the collected usage information at a tenant-level of a tenant account that accesses content through the plurality of websites;
    analyzing the aggregated usage information; and
    adjusting the service in response to an analysis of the aggregated usage information, wherein the adjusting further comprises: modifying, based on the analysis of the aggregated usage information, a retention time for the content that is stored using an online storage device associated with the service, and allocating the content to an offline storage device for the service based on a lapse of the retention time.

12. The computer-readable storage device of claim 11, further comprising storing the aggregated usage information within a search index of the service.

13. The computer-readable storage device of claim 11, wherein one or more of the online storage device and the offline storage device comprises storage allocated for the tenant account.

14. The computer-readable storage device of claim 11, wherein the retention time corresponds to an amount of time the content is stored on the online storage device without being accessed by the tenant account.

15. The computer-readable storage device of claim 11, wherein the method further comprising re-allocating the content to the online storage device based on access to the content by the tenant account.

16. The computer-readable storage device of claim 15, wherein one or more of the online storage device and the offline storage device is associated with the tenant account.

17. A system for integrating usage information with a service, comprising:
    a network connection that is coupled to tenants of the multi-tenant service;
    a processor and a computer-readable medium; and
    an operating environment stored on the computer-readable medium and executing, on the processor, computer-executable instructions that cause the processor to:
        access collected usage information that relates to service events and a user interaction with content of the service that is provided by a plurality of websites;
        aggregate the collected usage information at a site-level of a website, wherein the website is one of the plurality of websites;
        analyze the aggregated usage information; and
        adjust the service, wherein an adjustment performed comprises: modifying an allocation of content assigned to one or more storage tier levels corresponding with the website based on an analysis of the aggregated usage information, wherein the modifying comprises moving the content between a storage resource of a first storage tier and a storage resource of the second storage tier, wherein the first storage tier corresponds to content that is stored online and the second storage tier corresponds to content that is stored offline.

18. The system of claim 17, wherein aggregation of the collected usage information further comprises aggregating the collected usage information at a level of a tenant that accesses content associated with the service.

19. The system of claim 18, wherein the adjustment of further comprises determining content recommendations for the tenant based on analysis of the aggregated usage information, and transmitting the content recommendations to a client device associated with the tenant.

20. The system of claim 17, wherein the process is operative to provide the analysis of the aggregated usage information to a search engine service.

21. The system of claim 17, wherein the adjustment further comprises modifying a number of storage devices associated with the website.

22. The system of claim 21, wherein the modifying of the number of storage devices further comprises changing an allocation of the storage devices for one or more of the first storage tier and the second storage tier.

23. The system of claim 17, wherein the modifying of the allocation of content assigned to the one or more storage tier levels further comprises at least one selected from a group consisting of: moving the content from the storage resource of the first storage tier to the storage resource of the second storage tier, and moving the content from the storage resource of the second storage tier to the storage resource of the first storage tier.

* * * * *